(12) United States Patent
Fan et al.

(10) Patent No.: US 10,440,617 B2
(45) Date of Patent: *Oct. 8, 2019

(54) NETWORK DEVICE, TERMINAL DEVICE AND METHODS FOR FACILITATING HANDOVER OF TERMINAL DEVICE

(71) Applicant: Telefonaktiebolaget LM Ericsson (publ), Stockholm (SE)

(72) Inventors: Rui Fan, Beijing (CN); Stefan Wager, Espoo (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 16/011,633

(22) Filed: Jun. 18, 2018

(65) Prior Publication Data

US 2018/0302828 A1    Oct. 18, 2018

Related U.S. Application Data

(63) Continuation of application No. 15/028,363, filed as application No. PCT/CN2016/078296 on Apr. 1, 2016, now Pat. No. 10,028,180.

(51) Int. Cl.
*H04W 36/00* (2009.01)
*H04W 36/08* (2009.01)
(Continued)

(52) U.S. Cl.
CPC ... *H04W 36/0061* (2013.01); *H04W 36/0072* (2013.01); *H04W 36/0088* (2013.01);
(Continued)

(58) Field of Classification Search
CPC ..... H04B 7/024; H04L 5/0007; H04L 5/0035; H04W 36/0088; H04W 36/08;
(Continued)

(56) References Cited

U.S. PATENT DOCUMENTS

| 7,184,769 B2* | 2/2007 | Tsutsumi | H04W 36/18 370/331 |
| 7,266,381 B2* | 9/2007 | Charles | H04W 48/04 455/450 |

(Continued)

FOREIGN PATENT DOCUMENTS

| CN | 101374321 A | 2/2009 |
| CN | 101945452 A | 1/2011 |

(Continued)

OTHER PUBLICATIONS

International Search Report and Written Opinion for Application No. PCT/CN2016/078296, dated Dec. 29, 2016, 12 pages.

(Continued)

*Primary Examiner* — Matthew C Sams
(74) *Attorney, Agent, or Firm* — Sage Patent Group

(57) ABSTRACT

Methods respectively implemented in a network device and a terminal device for facilitating handover of the terminal device served by the network device to a target beam and/or network device. The method in the network device comprises transmitting information on configurations for a set of candidate target beams and/or network devices to the terminal device before the handover of the terminal device is triggered. The method further comprises transmitting a handover command to the terminal device to trigger the handover of the terminal device. The handover command contains an identifier for identifying, from the transmitted information on the configurations for the candidate target beams and/or network devices, the information on the configuration for the target beam and/or network device. The disclosure also provides a network device and a terminal device that perform the above methods respectively.

13 Claims, 9 Drawing Sheets

(51) Int. Cl.
*H04W 36/30* (2009.01)
*H04W 36/38* (2009.01)
*H04W 72/04* (2009.01)

(52) U.S. Cl.
CPC ....... *H04W 36/0094* (2013.01); *H04W 36/08* (2013.01); *H04W 36/30* (2013.01); *H04W 36/38* (2013.01); *H04W 72/046* (2013.01); *H04W 72/0446* (2013.01)

(58) Field of Classification Search
CPC ... H04W 36/18; H04W 52/40; H04W 72/085; H04J 11/0093
See application file for complete search history.

(56) References Cited

U.S. PATENT DOCUMENTS

| | | | | |
|---|---|---|---|---|
| 8,577,373 | B2* | 11/2013 | Matsuo | H04W 36/0072 455/435.1 |
| 9,461,785 | B2* | 10/2016 | Park | H04L 5/0007 |
| 2002/0072372 | A1* | 6/2002 | Tsutsumi | H04W 36/18 455/442 |
| 2008/0188215 | A1* | 8/2008 | Bergstrom | H04W 48/20 455/424 |
| 2008/0207207 | A1* | 8/2008 | Moe | H04J 11/0093 455/439 |
| 2009/0253461 | A1* | 10/2009 | Kuwahara | H04W 52/0206 455/561 |
| 2010/0167743 | A1* | 7/2010 | Palanki | H04B 7/155 455/436 |
| 2011/0098072 | A1* | 4/2011 | Kim | H04L 5/0032 455/509 |
| 2011/0211627 | A1* | 9/2011 | Suzuki | H04L 5/0007 375/224 |
| 2013/0182583 | A1* | 7/2013 | Siomina | H04W 24/10 370/252 |
| 2014/0235246 | A1* | 8/2014 | Lin | H04W 36/0088 455/436 |
| 2015/0011224 | A1 | 1/2015 | Kompalli | |
| 2015/0071191 | A1* | 3/2015 | Kim | H04L 5/0057 370/329 |
| 2015/0304868 | A1* | 10/2015 | Yu | H04W 56/001 370/312 |
| 2017/0195033 | A1* | 7/2017 | Zhang | H04W 72/046 |
| 2017/0289867 | A1* | 10/2017 | Fan | H04W 36/0061 |
| 2017/0295576 | A1* | 10/2017 | Fukuta | H04W 16/14 |

FOREIGN PATENT DOCUMENTS

| | | |
|---|---|---|
| CN | 102084687 A | 6/2011 |
| CN | 103916917 A | 7/2014 |
| EP | 2947953 A1 | 11/2015 |
| WO | 2012061770 A2 | 5/2012 |
| WO | 2013025539 A1 | 2/2013 |

OTHER PUBLICATIONS

Non-Final Office Action from U.S. Appl. No. 15/028,363, dated Nov. 3, 2017, 16 pages.
Notice of Allowance from U.S. Appl. No. 15/028,363, dated Mar. 19, 2018, 14 pages.
Extended European Search Report for Application No. 16845320.7, dated Jul. 4, 2018, 7 pages.
International Preliminary Report on Patentability for Application No. PCT/CN2016/078296, dated Jul. 24, 2018, 12 pages.

* cited by examiner

NETWORK DEVICE, TERMINAL DEVICE AND METHODS FOR FACILITATING HANDOVER OF TERMINAL DEVICE

CROSS-REFERENCE TO RELATED APPLICATIONS

This application is a continuation of application Ser. No. 15/028,363, filed Apr. 8, 2016, which is the National stage of International Application No. PCT/CN2016/078296, filed Apr. 1, 2016, which are all hereby incorporated by reference.

TECHNICAL FIELD

The present disclosure generally relates to the technical field of wireless communications, and particularly, to a network device, a terminal device and methods respectively implemented in the network device and the terminal device for facilitating handover of the terminal device served by the network device to a target beam and/or network device.

BACKGROUND ART

This section is intended to provide a background to the various embodiments of the technology described in this disclosure. The description in this section may include concepts that could be pursued, but are not necessarily ones that have been previously conceived or pursued. Therefore, unless otherwise indicated herein, what is described in this section is not prior art to the description and/or claims of this disclosure and is not admitted to be prior art by the mere inclusion in this section.

To improve the throughput of wireless communication systems so as to provide high-speed data services to a large amount of terminal devices, it has been proposed to employ a frequency spectrum which is much higher than those where conventional systems (such as the 2nd-4th (2G-4G) systems) are deployed. At such a spectrum (in the order of tens of GHz, for example), the atmospheric attenuation, penetration and diffraction properties of electromagnetic waves are much worse than at relatively lower frequencies. In addition, the link budget would be worse for the same link distance even in a free space scenario. This motivates the use of beamforming to concentrate the energy of transmitted wireless signals to compensate for the loss of link budget in high-frequency spectrum.

SUMMARY

As a result of the above described radio propagation properties and beamforming, the radio coverage area offered by a network device in high-frequency wireless communication systems would be much smaller than in existing low-frequency systems. Together with the limited ability for the radio waves at the concerned frequencies to diffract, this makes sudden loss of coverage of its serving network device a potentially much more frequent event to a moving terminal device.

Thus, a terminal device has to be handed over to a new beam and/or network device when its current serving beam can no longer provide the coverage it needs, and the terminal device can only know which beam and/or network device to connect to and how to connect to the target beam and/or network device during a handover procedure via a HO command received from its serving network device.

Such a HO command is a bit large in size as it includes all necessary information to tell the terminal device how to connect to a target beam and/or network device (hereinafter referred to as information on configuration for the target beam and/or network device). Accordingly, the transmission of the HO command is relatively time consuming and not easy to protect (for example, through the use of Forward Error Correction (FEC) encoding). Moreover, because the HO command is vulnerable to transmission error as explained above, there is a higher risk that the terminal device does not successfully receive the HO command from its serving network device and thus cannot know which beam and/or network device to connect to and how to connect thereto. Accordingly, it has to detect a new network device from scratch and the overall recover procedure takes a relatively long time.

In general, embodiments of the present disclosure provide solutions for facilitating handover of a terminal device served by a network device to a target beam and/or network device.

According to a first aspect of the present disclosure, there is provided a method in a network device for facilitating handover of a terminal device served by the network device to a target beam and/or network device. The method includes transmitting information on configurations for a set of candidate target beams and/or network devices to the terminal device before the handover of the terminal device is triggered. The method further includes transmitting a handover command to the terminal device to trigger the handover of the terminal device. The handover command contains an identifier for identifying, from the transmitted information on the configurations for the candidate target beams and/or network devices, the information on the configuration for the target beam and/or network device.

With the proposed solution, information on configurations for all candidate target beams and/or network devices is transmitted to the terminal device indicating how to connect to the respective candidate target beams and/or network devices, before a handover command containing an identifier is transmitted to the terminal device identifying, from the transmitted configuration information, the specific part for the actual target beam and/or network device of the terminal device. As such, the information on the configuration for the actual target beam and/or network device can be omitted from the HO command. Accordingly, the HO command is significantly reduced in size as compared with the existing HO command which contains not only an identifier of but also detailed configuration information for the actual target beam and/or network device of the terminal device as described above. Moreover, the transmission of the configuration information for the actual target beam and/or network device as well as other candidate target beam and/or network device is reliable, as it occurs when there is a good connection between the terminal device and its serving network device and the handover of the terminal device is not triggered yet.

In an embodiment, the information on the configurations for the candidate target beams and/or network devices may be stored in a table with indexes each uniquely identifying, from the table, an entry containing information on a respective one of the configurations for the candidate target beams and/or network devices. The identifier for identifying the information on the configuration for the target beam and/or network device may be one of the indexes which identifies an entry containing the information on the configuration for the target beam and/or network device.

In an embodiment, the indexes may be generated from identifiers of the candidate target beams and/or network devices, respectively.

In an embodiment, the set of candidate target beams and/or network devices may include some or all of neighboring beams and/or network devices of the terminal device's serving beam and/or network device.

In an embodiment, the information on the configurations for the set of candidate target beams and/or network devices may be transmitted to the terminal device immediately after the terminal device connects to its serving beam and/or network device.

In an embodiment, the information on the configurations for the set of candidate target beams and/or network devices may be transmitted to the terminal device when communication quality between the terminal device and its serving beam and/or network device falls down below a threshold.

In an embodiment, the method may further include stopping Mobile Reference Signal (MRS) transmissions from the serving network device and from all the set of candidate target beams and/or network devices except the target beam and/or network device after the handover command is transmitted and requiring only the target beam and/or network device to transmit a MRS for a predetermined time period after the handover command is transmitted, so that the identifier for identifying the information on the configuration for the target beam and/or network device is derivable at the terminal device from the MRS transmitted via the target beam and/or network device and received by the terminal device.

According to a second aspect of the present disclosure, there is provided a method in a terminal device for facilitating handover of the terminal device served by its serving network device to a target beam and/or network device. The method includes receiving information on configurations for a set of candidate target beams and/or network devices from the serving network device before the handover of the terminal device is triggered. The method further includes identifying, from the received information on the configurations for the candidate target beams and/or network devices, information on a configuration for the target beam and/or network device, based on a received or derived identifier for the information on the configuration for the target beam and/or network device.

In an embodiment, the method may further include receiving from the serving network device a handover command that triggers the handover of the terminal device, wherein the handover command contains the identifier for the information on the configuration for the target beam and/or network device.

In an embodiment, the method may further include receiving a MRS from the target beam and/or network device for a predetermined time period while no MRS is received from the serving beam and/or network device or other candidate target beams and/or network devices among the set of candidate target beams and/or network devices during the time period. Then, the identifier for the information on the configuration for the target beam and/or network device is derived from the MRS received from the target beam and/or network device.

According to a third aspect of the present disclosure, there is provided a network device for facilitating handover of a terminal device served by the network device to a target beam and/or network device. The network device includes a generating unit and a transceiving unit. The generating unit is configured to generate information on configurations for a set of candidate target beams and/or network devices transmitted to the terminal device before the handover of the terminal device is triggered. The generating unit is further configured to generate a handover command transmitted to the terminal device to trigger the handover of the terminal device. The handover command contains an identifier for identifying, from the transmitted information on the configurations for the candidate target beams and/or network devices, the information on the configuration for the target beam and/or network device. The transceiving unit is configured to transmit the information on configurations for the set of candidate target beams and/or network devices and the handover command to the terminal device.

According to a fourth aspect of the present disclosure, there is provided a terminal device for facilitating handover of the terminal device served by its serving network device to a target beam and/or network device. The terminal device includes a transceiving unit and an identifying unit. The transceiving unit is configured to receive information on configurations for a set of candidate target beams and/or network devices from the serving network device before the handover of the terminal device is triggered. The identifying unit is configured to identify, from the received information on the configurations for the candidate target beams and/or network devices, information on a configuration for the target beam and/or network device, based on a received or derived identifier for the information on the configuration for the target beam and/or network device.

In an embodiment, the transceiving unit may be further configured to receive from the serving network device a handover command that triggers the handover of the terminal device, wherein the handover command contains the identifier for the information on the configuration for the target beam and/or network device.

In an embodiment, the transceiving unit may be further configured to receive a MRS from the target beam and/or network device for a predetermined time period while no MRS is received from the serving beam and/or network device or other candidate target beams and/or network devices among the set of candidate target beams and/or network devices during the time period. The terminal device may further include a deriving unit configured to derive the identifier for the information on the configuration for the target beam and/or network device from the MRS received from the target beam and/or network device.

According to a fifth aspect of the present disclosure, there is provided a network device for facilitating handover of a terminal device served by the network device to a target beam and/or network device. The network device includes a memory and a processor. The memory has machine-readable instructions stored therein. The processor executes the stored machine-readable instructions to control the network device to perform the method according to the first aspect of the present disclosure.

According to a sixth aspect of the present disclosure, there is provided a terminal device for facilitating handover of the terminal device served by its serving network device to a target beam and/or network device. The terminal device includes a method and a processor. The memory has machine-readable instructions stored therein. The processor executes the stored machine-readable instructions to control the terminal device to perform the method according to the second aspect of the present disclosure.

According to a seventh aspect of the present disclosure, there is provided a computer program product including a non-transitory computer readable storage medium storing therein executable instructions configured to implement a method according to the first aspect or the second aspect of the disclosure.

According to an eighth aspect of the present disclosure, there is provided a method performed in a wireless communication network for facilitating handover of a terminal device served by its serving network device to a target beam and/or network device. The method includes initiating, by a handover control unit, transmission of a handover command to the terminal device to trigger the handover of the terminal device. Information on configurations for a set of candidate target beams and/or network devices have been transmitted to the terminal device before the handover of the terminal device is triggered. The handover command contains an identifier for identifying, from the transmitted information on the configurations for the candidate target beams and/or network devices, the information on the configuration for the target beam and/or network device.

BRIEF DESCRIPTION OF THE DRAWINGS

The above and other aspects, features, and advantages of the present disclosure will become more fully apparent from the following descriptions on embodiments of the present disclosure with reference to the drawings, in which like reference numerals or letters are used to designate like or equivalent elements and in which.

Figure 1:
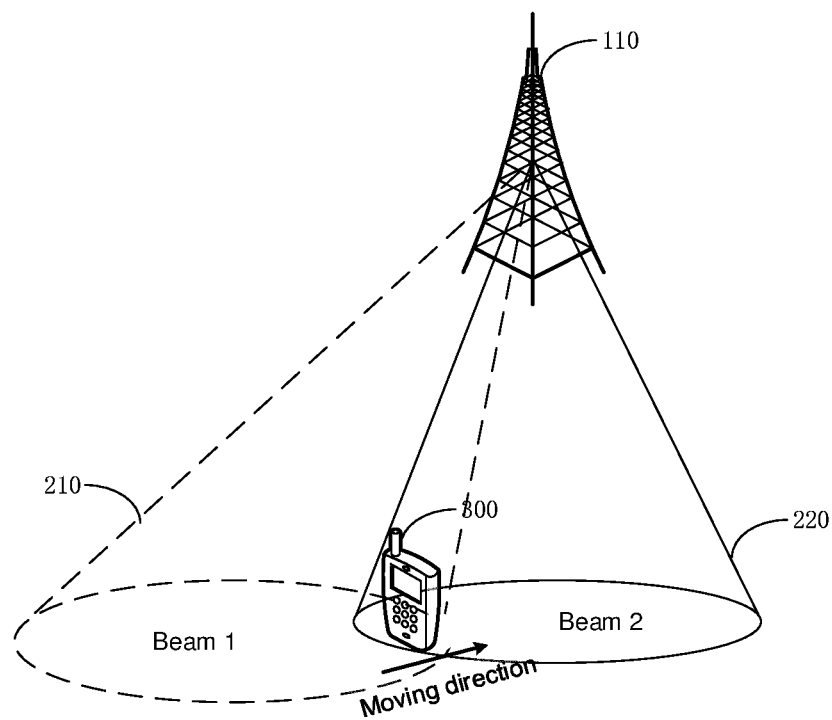
FIG. 1 is a diagram illustrating a first handover scenario where a terminal device is handed over between beams from the same network device.

The drawings are illustrated for facilitating better understanding of the embodiments of the disclosure and not necessarily drawn to scale.

DETAILED DESCRIPTION

In the discussion that follows, specific details of particular embodiments of the present disclosure are set forth for purposes of explanation and not limitation. It will be appreciated by those skilled in the art that other embodiments may be employed apart from these specific details. Furthermore, in some instances detailed descriptions of well-known methods, nodes, interfaces, circuits, and devices are omitted so as not to obscure the description with unnecessary detail. Those skilled in the art will appreciate that the functions described may be implemented in one or in several nodes.

As used herein, the term "terminal device" refers to any end device that can access a wireless communication network and receive services therefrom. By way of example and not limitation, a terminal device may be a user equipment (UE), which may be a Subscriber Station (SS), a Portable Subscriber Station, a Mobile Station (MS), or an Access Terminal (AT). The mobile terminal may include, but is not limited to, a mobile phone, a cellular phone, a smart phone, a tablet, a wearable device, a personal digital assistant (PDA), and the like.

The term "network device" refers to a device at the network side and may include a network device via which a terminal device accesses the network and receives services therefrom. By way of example, such a network device may be a base station (BS), a node B (NodeB or NB), an evolved NodeB (eNodeB or eNB), a Remote Radio Unit (RRU), a radio header (RH), a remote radio head (RRH), a relay, a low power node such as a femto, a pico, and so forth.

The terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Some or all of the functions described may be implemented using hardware circuitry, such as analog and/or discrete logic gates interconnected to perform a specialized function, Application Specific Integrated Circuits (ASICs), Programmable Logical Arrays (PLAs), etc. Likewise, some or all of the functions may be implemented using software programs and data in conjunction with one or more digital microprocessors or general purpose computers. Where nodes that communicate using the air interface are described, it will be appreciated that those nodes also have suitable radio communications circuitry. Moreover, the technology can additionally be considered to be embodied entirely within any form of computer-readable memory, including non-transitory embodiments such as solid-state memory, magnetic disk, or optical disk containing an appropriate set of computer instructions that would cause a processor to carry out the techniques described herein.

Hardware implementations of the presently disclosed techniques may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors or one or more controllers, and the terms computer, processor, and controller may be employed interchangeably. When provided by a computer, processor, or controller, the functions may be provided by a single dedicated computer or processor or controller, by a single shared computer or processor or controller, or by a plurality of individual computers or processors or controllers, some of which may be shared or distributed. Moreover, the term "processor" or "controller" also refers to other hardware capable of performing such functions and/or executing software, such as the example hardware recited above.

Note that, although systems utilizing beamforming are described in the background section, solutions proposed here may or may not be used together with beamforming. In the former case, the proposed solutions are applicable to a first handover scenario where the handover of a terminal device occurs between beams from the same network device or a second handover scenario where the handover of a terminal device occurs between beams from different network devices. In the latter case, the proposed solutions are applicable to a third handover scenario where the handover of a terminal device occurs between different network devices.

Figure 2:
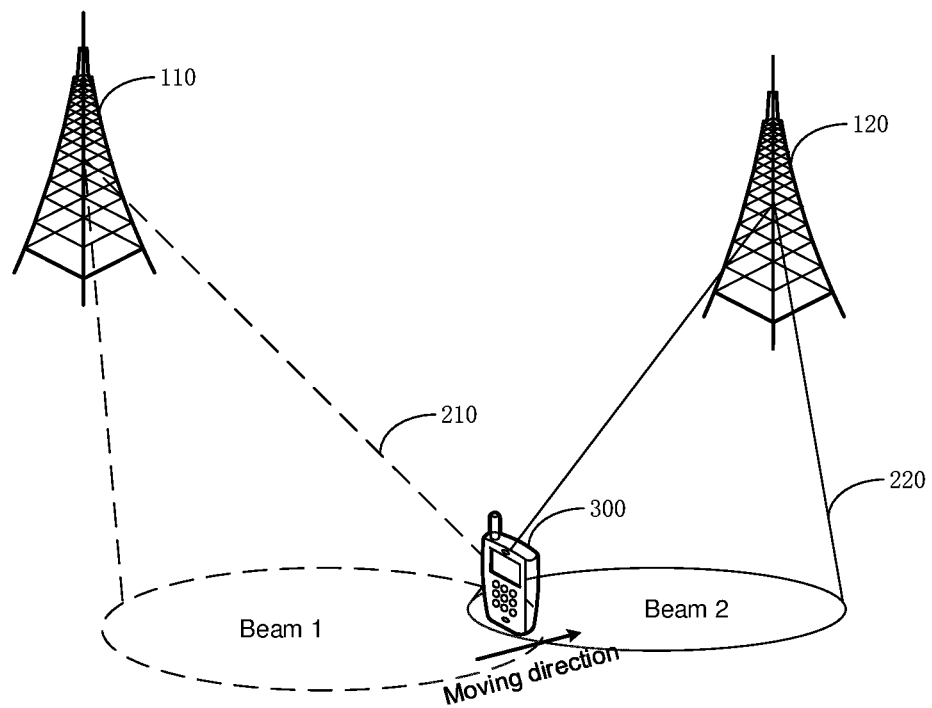
FIG. 2 is a diagram illustrating a second handover scenario where a terminal device is handed over between beams from different network devices.
Figure 3:
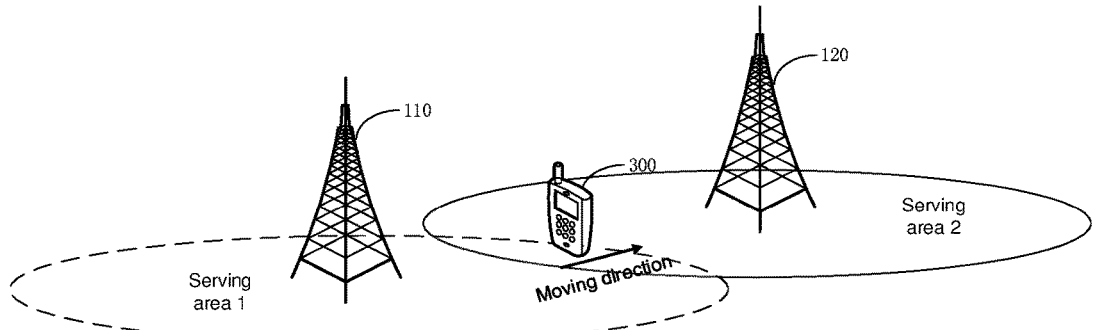
FIG. 3 is a diagram illustrating a third handover scenario where a terminal device is handed over between different network devices each performing transmission in an omnidirectional manner.

By way of illustration, FIG. 1 depicts the first handover scenario, where beams 210 and 220 are transmitted from a network device 110 and a terminal device 300 is handed over from beam 210 to beam 220 as it moves from the coverage area of beam 210 to the coverage area of beam 220. FIG. 2 depicts the second handover scenario, where a beam 210 and a beam 220 are respectively transmitted from a network device 110 and a network device 120 and a terminal device 300 is handed over from beam 210 to beam 220 as it moves from the coverage area of beam 210 and hence network device 110 to the coverage area of beam 220 and hence network device 120. FIG. 3 depicts the third handover scenario, where a network device 110 and a network device 120 each serve a coverage area in an omnidirectional manner and a terminal device 300 is handed over from network device 110 to network device 120 as it moves from the coverage area of network device 110 to the coverage area of network device 120.

To facilitate understanding, reference numbers in FIGS. 1-3 will be used to denote corresponding elements when describing the proposed solutions in detail.

Figure 4:
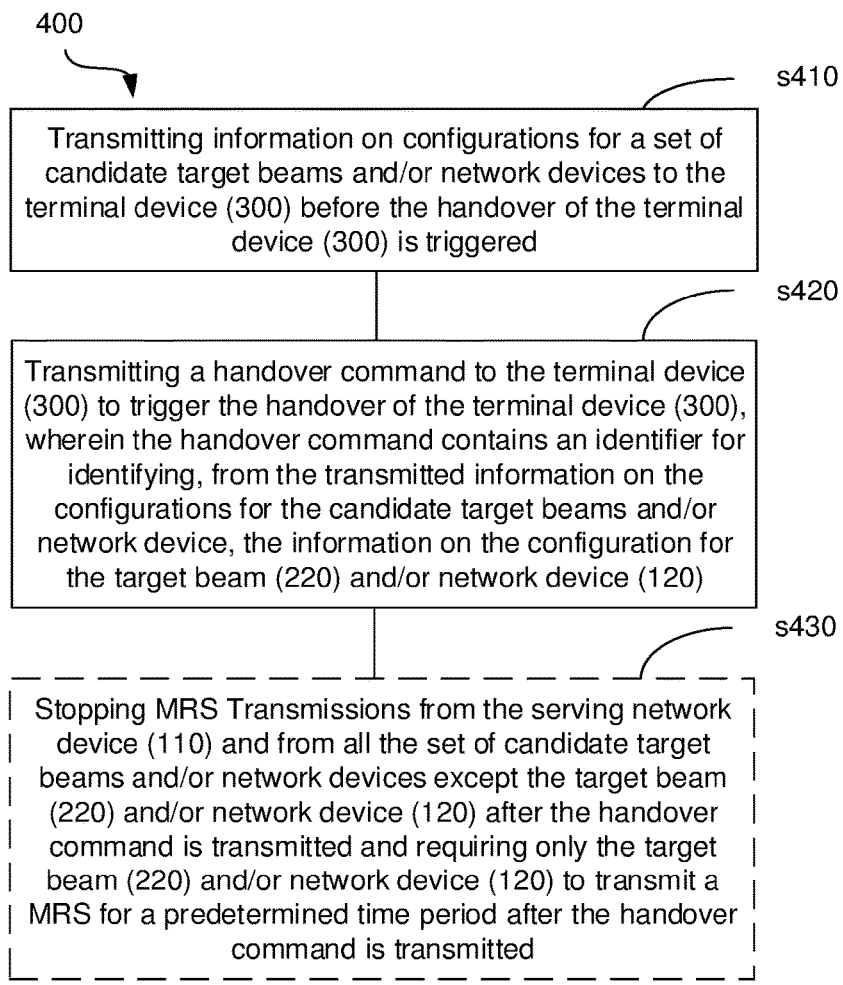
FIG. 4 is a flowchart illustrating a method implemented in a network device for facilitating handover of a terminal device served by a network device to a target beam and/or network device according to the present disclosure.

FIG. 4 schematically illustrates a method 400 in a network device 110 for facilitating handover of a terminal device 300 served by the network device 110 to a target beam 220 and/or network device 120 according to the present disclosure.

As illustrated, the method begins with block s410, at which information on configurations for a set of candidate target beams and/or network devices is transmitted to the terminal device 300 before the handover of the terminal device 300 is triggered.

As used herein, the expression "a configuration for a candidate target beam and/or network device" specifies how to connect to the candidate target beam and/or network device, and needs to be known to the terminal device 300 for handover to the candidate target beam and/or network device. By way of example, such a configuration may include but is not limited to random access related configuration, such as at which time and frequency to send a Physical Random Access Channel (PRACH) preamble, how to receive a Radio Access Response (RAR) from the network, is the RAR accompanied with a control channel or not, or blind detection is needed to decode RAR, where is the Reference Signal (RS) located for RAR, what is the RS to be used for UE to transmit message 3.

In practical implementation, the set of candidate target beams and/or network devices may include all neighboring beams and/or network devices of the terminal device's serving beam 210 and/or network device 110. The neighboring beams and/or network devices may be configured by Operation and Maintenance (O&M), for example.

To further reduce information to be communicated between the terminal device and its serving network device and hence the consumption of limited radio resources available for communications therebetween, the set of candidate target beams and/or network devices may include some of all the neighboring beams and/or network devices of the terminal device's serving beam 210 and/or network device 110.

In an implementation, the neighboring beams and/or network devices included in the set of candidate target beams and/or network devices may be selected from all the neighboring beams and/or network devices according to a predicted moving track of the terminal device. For example, the terminal device may be mounted on a bus which sticks to a predetermined schedule and moves along a fixed route. In that case, the neighboring beams and/or network devices included in the set of candidate target beams and/or network devices may be selected as those along the route.

Alternatively or additionally, the beams and/or network devices included in the set of candidate target beams and/or network devices may be selected from all the neighboring beams and/or network devices according to habits of the user of the terminal device and/or monitored qualities of the neighboring beams and/or network devices. For example, the terminal device may be used by a person who is used to taking exercises in a park every morning. In that case, the neighboring beams and/or network devices included in the set of candidate target beams and/or network devices may be selected as those having coverage areas within or overlapping the area of the park. As another example, the neighboring beams and/or network devices included in the set of candidate target beams and/or network devices may be selected as those whose qualities are better than a threshold.

In case the specific handover scenario can be predicted by the serving network device 110 according to whether beamforming is employed and a current location of the terminal device 300, the serving network device 110 can selectively transmit the information on configurations for the set of candidate target beams and network devices, the information on configurations for the set of candidate target beams or the information on configurations for the set of candidate target network devices to the terminal device 300 at block 410.

Specifically, in case the serving network device 110 determines that it supports beamforming and that the terminal device is far from the edge of its coverage area, then it can predict the specific handover scenario as the first handover scenario described above. In that case, the serving network device 110 only needs to transmit the information on configurations for the set of candidate target beams to the terminal device 300 at block s410.

In case the serving network device 110 determines that its neighboring network devices and itself support beamforming and that the terminal device is near the edge of its coverage area, then it can predict the specific handover scenario as the second handover scenario described above. In that case, the serving network device 110 has to transmit the information on configurations for the set of candidate target beams and network devices to the terminal device 300.

In case the serving network device 110 determines that its neighboring network devices and itself do not support beamforming and that the terminal device is near the edge of its coverage area, then it can predict the specific handover scenario as the third handover scenario described above. In that case, the serving network device only needs to transmit the information on configurations for the set of candidate target beams to the terminal device 300.

In practical implementation, the information on the configurations for the set of candidate target beams and/or network devices may be transmitted to the terminal device 300 immediately after the terminal device connects to its serving beam 210 and/or network device 110.

Alternatively, the information on the configurations for the set of candidate target beams and/or network devices may be transmitted to the terminal device 300 when communication quality between the terminal device and its serving beam 210 and/or network device 110 falls down below a threshold (denoted as T1). Supposing the handover of the terminal device is triggered when the communication quality between the terminal device and its serving beam 210 and/or network device 110 falls down below a threshold (denoted as T2), T1 should be higher than T2.

Referring back to FIG. 4, after block s410, a handover command is transmitted to the terminal device 300 at block s420 to trigger the handover of the terminal device 300. The handover command contains an identifier for identifying, from the transmitted information on the configurations for the candidate target beams and/or network devices, the information on the configuration for the target beam 220 and/or network device 120.

By way of example and not limitation, the identifier of the target beam 220 and/or network device 120 may be used as the identifier contained in the handover command.

In practical implementation, the information on the configurations for the candidate target beams and/or network devices may be stored in a table with indexes each uniquely identifying, from the table, an entry containing information on a respective one of the configurations for the candidate target beams and/or network devices. In this case, the identifier for identifying the information on the configuration for the target beam 220 and/or network device 120 may be one of the indexes which identifies an entry containing the information on the configuration for the target beam 220 and/or network device 120.

As well known to those skilled in the art, a table refers to a two-dimensional data structure that stores data elements in rows and columns. In case the information on the configurations for the candidate target beams and/or network devices is stored in a table, the configuration for each candidate target beam and/or network device may be stored in a respective row of the table, and the values of the same item (for example, at which time and frequency to send a Physical Random Access Channel (PRACH) preamble) of the configurations for the candidate target beams and/or network devices may be stored in a respective column of the table.

By way of example and not limitation, the indexes may be generated from identifiers of the candidate target beams and/or network devices, respectively.

As those skilled in the art will appreciate, any other data structure may be used instead of a table, as long as it can carry the configuration information for all candidate target beams and/or network devices.

With the proposed method, information on configurations for all candidate target beams and/or network devices is transmitted to the terminal device indicating how to connect to the respective candidate target beams and/or network devices, before a handover command containing an identifier is transmitted to the terminal device identifying, from the transmitted configuration information, the specific part for the actual target beam and/or network device of the terminal device.

As such, the information on the configuration for the actual target beam and/or network device can be omitted from the HO command. Accordingly, the HO command is significantly reduced in size as compared with the prior art HO command which contains not only an identifier of but also detailed configuration information for the actual target beam and/or network device of the terminal device. Accordingly, the HO command can be transmitted in a shorter time period with higher reliability.

Moreover, the transmission of the configuration information for the actual target beam and/or network device as well as other candidate target beam and/or network device is reliable, as it occurs when there is a good connection between the terminal device and its serving network device and the handover of the terminal device is not triggered yet.

In an embodiment, the method 400 may further comprise block s430 shown in dashed block in FIG. 4. At this block, the serving network device 110 stops Mobile Reference Signal (MRS) transmissions from the serving network device 110 and from all the set of candidate target beams and/or network devices except the target beam 220 and/or network device 120 after the handover command is transmitted and requires only the target beam and/or network device to transmit a MRS for a predetermined time period after the handover command is transmitted, so that the identifier for identifying the information on the configuration for the target beam 220 and/or network device 120 is derivable at the terminal device from the MRS transmitted via the target beam and/or network device and received by the terminal device.

In this manner, even if the terminal device 300 fails to receive the handover command transmitted by its serving network device 110 at block s420 due to poor communication quality therebetween, it can derive from the received MRS an identifier for identifying, from the received configuration information for all candidate target beams and/or network devices, the specific part for the actual target beam 220 and/or network device 120. As a result, the risk of handover failure is reduced.

Correspondingly to the above-described method 400 implemented in a terminal device's serving network device, the present disclosure provides a method 500 implemented in the terminal device for facilitating handover of the terminal device to a target beam and/or network device.

Figure 5:
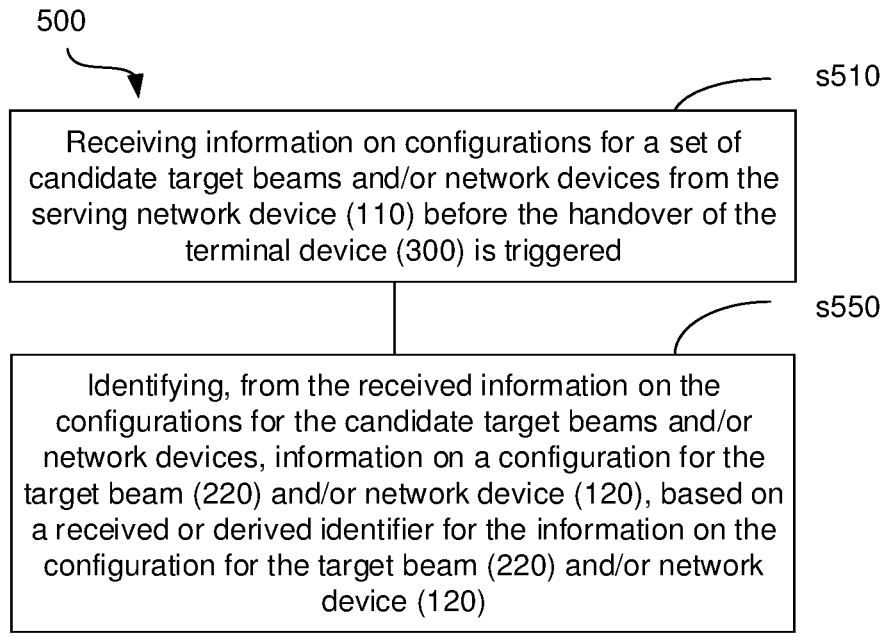
FIGS. 5-7 are flowcharts illustrating a method implemented in a terminal device for facilitating handover of a terminal device served by a network device to a target beam and/or network device according to the present disclosure.

As illustrated in FIG. 5, the method 500 begins with block s510, at which information on configurations for a set of candidate target beams and/or network devices is received from the serving network device 110 before the handover of the terminal device 300 is triggered. After block s510, information on a configuration for the target beam 220 and/or network device 120 is identified at block s550 from the received information on the configurations for the candidate target beams and/or network devices, based on a received or derived identifier for the information on the configuration for the target beam 220 and/or network device 120.

Figure 6:
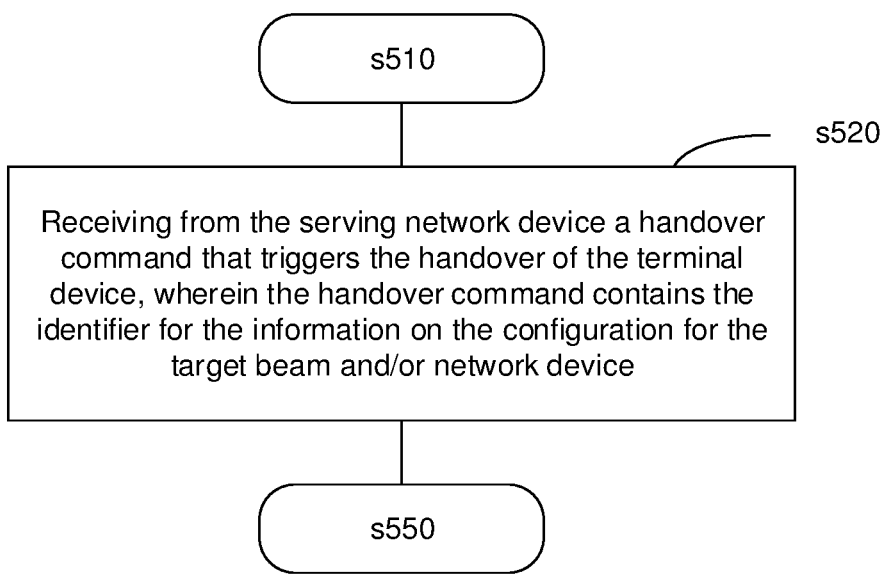

In an embodiment, the method 500 may further comprise block s520 as illustrated in FIG. 6. At this block, the terminal device 300 receives from the serving network device 110 a handover command that triggers the handover of the terminal device 300. The handover command contains the identifier for the information on the configuration for the target beam 220 and/or network device 120.

Figure 7:
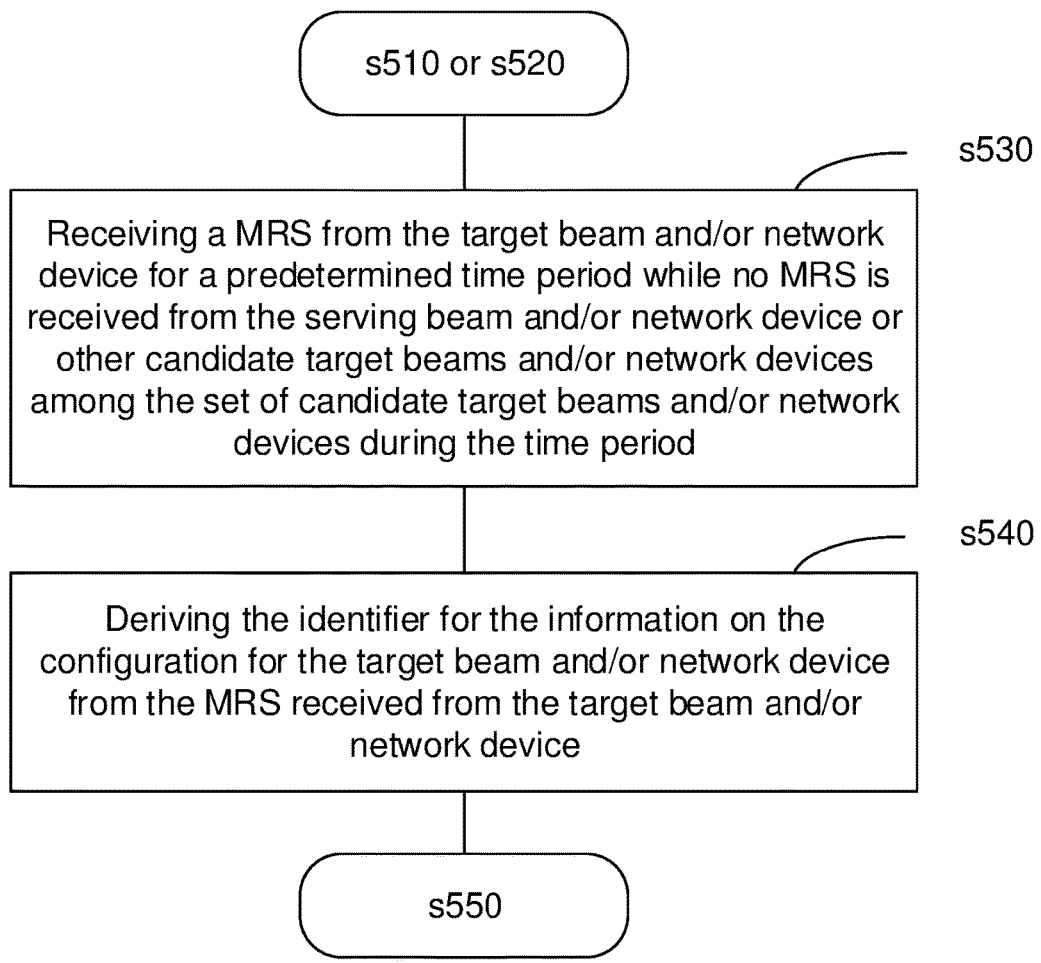

In another embodiment, the method 500 may further comprise blocks s530 and s540 as illustrated in FIG. 7. At block s530, the terminal device 300 receives a MRS from the target beam and/or network device for a predetermined time period while no MRS is received from the serving beam and/or network device or other candidate target beams and/or network devices among the set of candidate target beams and/or network devices during the time period. At block s540, the terminal device 300 derives the identifier for the information on the configuration for the target beam 220 and/or network device 120 from the MRS received from the target beam and/or network device.

Figure 8:
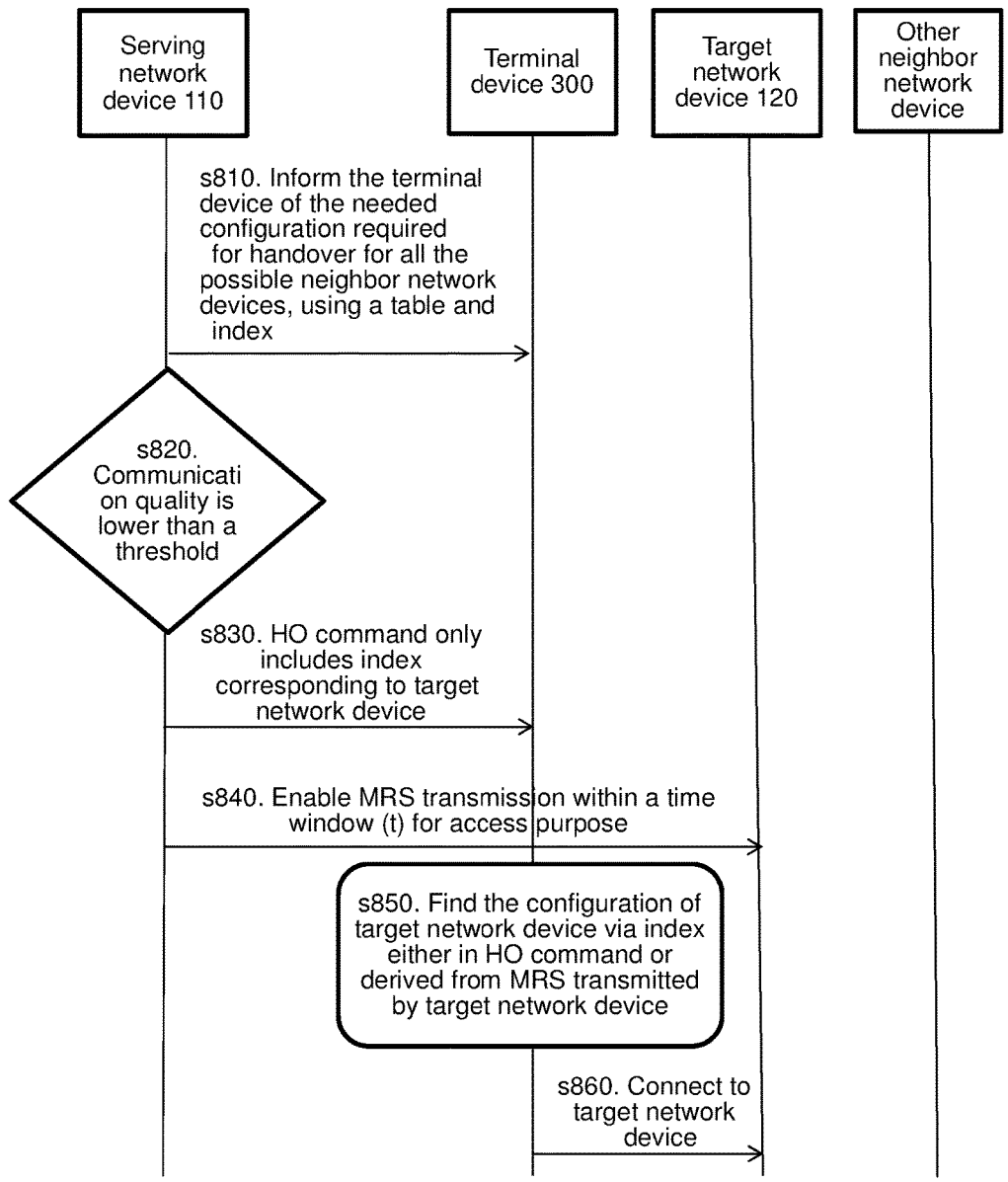
FIG. 8 is a diagram schematically an example of how a terminal device and its serving network device cooperate with each other to facilitate handover of the terminal device according to the present disclosure.

To facilitate understanding, FIG. 8 presents an example of how the serving network device 110 and the terminal device 300, which perform the above-described methods 400 and 500 respectively, cooperate with each other to facilitate handover of the terminal device 300. For the sake of simplicity, the example is described with respect to the above-described third handover scenario, where the network device 110 and the network device 120 each serve a coverage area in an omnidirectional manner and the terminal device 300 is handed over from network device 110 to network device 120 as it moves from the coverage area of network device 110 to the coverage area of network device 120.

As illustrated in FIG. 8, at step s810, the serving network device 110 transmits information on configurations for a set of candidate target network devices to the terminal device 300. By way of example, the set of candidate target network devices include all neighboring network devices of the terminal device's serving network device 110, and the information on the configurations for the candidate network devices is stored in a table with indexes.

Upon detecting that communication quality between the terminal device 300 and the serving network device 110 is lower than a threshold at step s820, the serving network device 10 transmits a handover command to the terminal device 300 at step s830. The handover command contains an identifier for identifying, from the transmitted information on the configurations for the candidate target network devices, the information on the configuration for the target network device 120. In case the information on the configurations for the candidate network devices is stored in a table with indexes, the identifier contained in the handover command may be one of the indexes which corresponds to the target network device 120.

In addition, at step s840 which is performed in serial or in parallel with step s830, the serving network device 110 stops MRS transmission after the handover command is transmitted and requires only the target network device 120 among the set of candidate target network devices to transmit a MRS for a predetermined time period (denoted as t) after the handover command is transmitted, so that the identifier for identifying the information on the configuration for the target network device 120 is derivable at the terminal device 300 from the MRS transmitted via the target network device 120 and received by the terminal device 300.

In response, at step s850, the terminal device 300 identifies, from the information on the configurations for the candidate target beams and/or network devices received at step s810, information on a configuration for the target network device 120, based on a received or derived identifier for the information on the configuration for the target network device 120. Finally, at step s860, the terminal device 300 connects to the target node 120 according to the identified information on a configuration for the target network device 120.

In the following, exemplary functional structures and software-based implementations of a network device 110 and a terminal device 300 according to the present disclosure will be given with reference to FIGS. 9-12.

Figure 9:
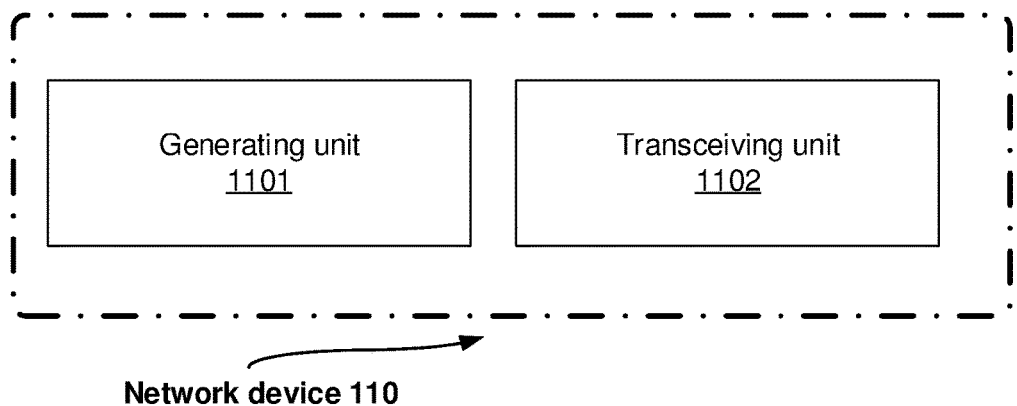
FIG. 9 is a block diagram illustrating an exemplary functional structure of a network device according to the present disclosure.

As shown in FIG. 9, the network device 110 includes a generating unit 1101 and a transceiving unit 1102. The generating unit 1101 is configured to generate information on configurations for a set of candidate target beams and/or network devices transmitted to the terminal device 300 before the handover of the terminal device 300 is triggered. The generating unit 1101 is further configured to generate a handover command transmitted to the terminal device 300 to trigger the handover of the terminal device 300. The handover command contains an identifier for identifying, from the transmitted information on the configurations for the candidate target beams and/or network devices, the information on the configuration for the target beam 220 and/or network device 120. The transceiving unit 1102 is configured to transmit the information on configurations for the set of candidate target beams and/or network devices and the handover command to the terminal device 300.

In an embodiment, the information on the configurations for the candidate target beams and/or network devices may be stored in a table with indexes each uniquely identifying, from the table, an entry containing information on a respective one of the configurations for the candidate target beams and/or network devices. The identifier for identifying the information on the configuration for the target beam 220 and/or network device 120 may be one of the indexes which identifies an entry containing the information on the configuration for the target beam 220 and/or network device 120.

In an embodiment, the indexes may be generated from identifiers of the candidate target beams and/or network devices, respectively.

In an embodiment, the set of candidate target beams and/or network devices may include all neighboring beams and/or network devices of the terminal device's serving beam 210 and/or network device 110.

In an embodiment, the set of candidate target beams and/or network devices may include some neighboring beams and/or network devices of the terminal device's serving beam 210 and/or network device 110, which are selected according to a predicted moving track of the terminal device.

In an embodiment, the information on the configurations for the set of candidate target beams and/or network devices may be transmitted to the terminal device 300 immediately after the terminal device connects to its serving beam 210 and/or network device 110.

In an embodiment, the information on the configurations for the set of candidate target beams and/or network devices may be transmitted to the terminal device 300 when communication quality between the terminal device and its serving beam 210 and/or network device 110 falls down below a threshold.

As those skilled in the art will appreciate, the above-described units may be implemented separately as suitable dedicated circuits. Nevertheless, these units can also be implemented using any number of dedicated circuits through functional combination or separation. In some embodiments, these units may be even combined in a single application specific integrated circuit (ASIC).

Figure 10:
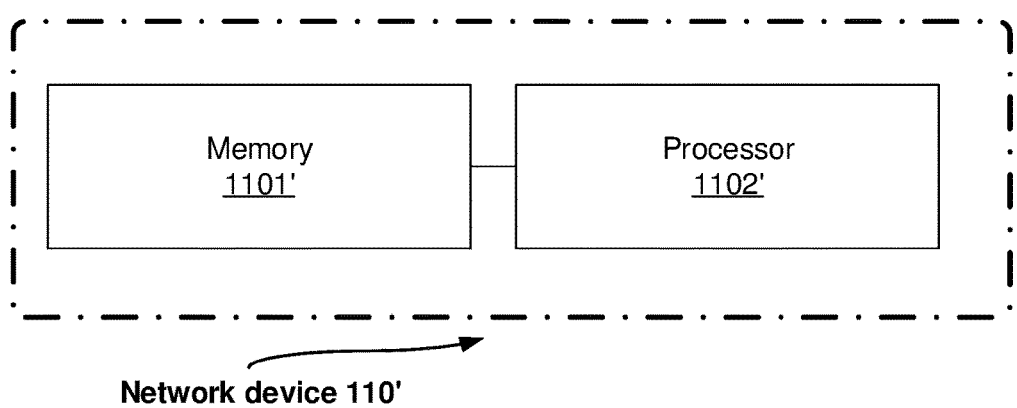
FIG. 10 is a block diagram illustrating an exemplary software-based implementation of a network device according to the present disclosure.

As an alternative software-based implementation, there is provided a network device 110' including a memory 1101' and a processor 1102' (including but not limited to a microprocessor, a microcontroller or a Digital Signal Processor (DSP), etc.) as illustrated in FIG. 10. The memory 1101' stores machine-readable program code executable by the processor. The processor 1102', when executing the machine-readable program code, controls the network device 110' to perform the above-described method 400.

Figure 11:
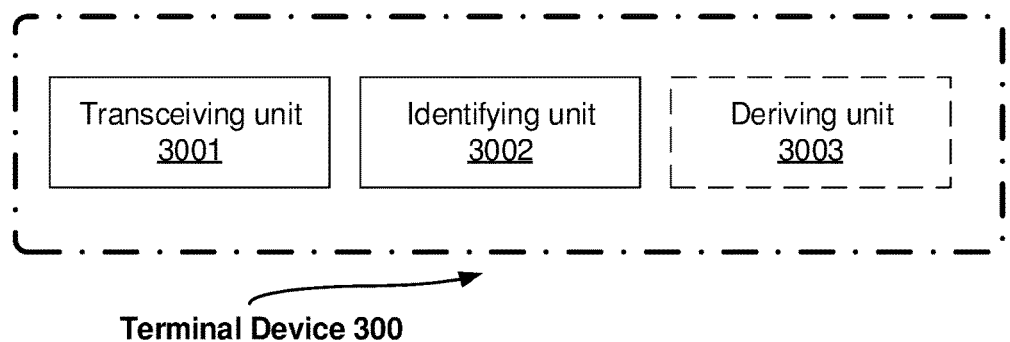
FIG. 11 is a block diagram illustrating an exemplary functional structure of a terminal device according to the present disclosure.

Referring then to FIG. 11, the terminal device 300 includes a transceiving unit 3001 and an identifying unit 3002. The transceiving unit 3001 is configured to receive information on configurations for a set of candidate target beams and/or network devices from the serving network device 110 before the handover of the terminal device 300 is triggered. The identifying unit 3002 is configured to identify, from the received information on the configurations for the candidate target beams and/or network devices, information on a configuration for the target beam 220 and/or network device 120, based on a received or derived identifier for the information on the configuration for the target beam 220 and/or network device 120.

In an embodiment, the transceiving unit 3001 may be further configured to receive from the serving network device 110 a handover command that triggers the handover of the terminal device 300, wherein the handover command contains the identifier for the information on the configuration for the target beam 220 and/or network device 120.

In an embodiment, the transceiving unit 3001 may be further configured to receive a MRS from the target beam and/or network device for a predetermined time period while no MRS is received from the serving beam and/or network device or other candidate target beams and/or network devices among the set of candidate target beams and/or network devices during the time period. The terminal device 300 may further comprise a deriving unit 3003 configured to derive the identifier for the information on the configuration for the target beam 220 and/or network device 120 from the MRS received from the target beam and/or network device.

As those skilled in the art will appreciate, the above-described units may be implemented separately as suitable dedicated circuits. Nevertheless, these units can also be implemented using any number of dedicated circuits through functional combination or separation. In some embodiments, these units may be even combined in a single application specific integrated circuit (ASIC).

Figure 12:
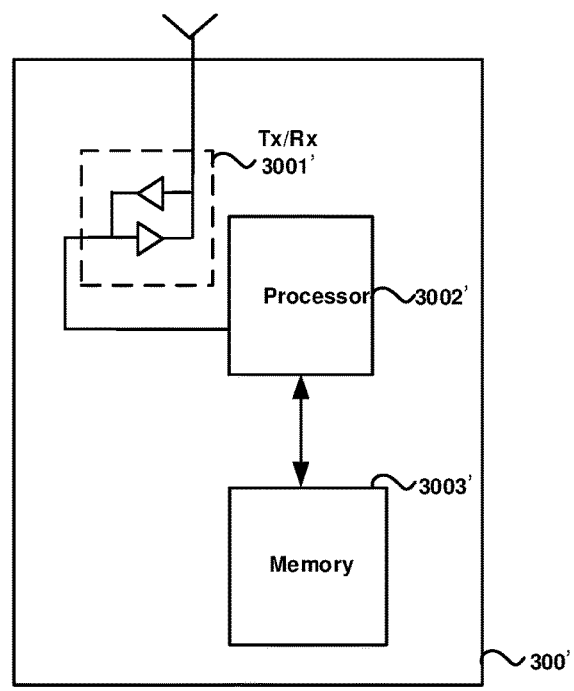
FIG. 12 is a block diagram illustrating an exemplary software-based implementation of a terminal device according to the present disclosure.

As an alternative software-based implementation, there is provided a terminal device 300' including a transceiver 3001', a processor 3002' (including but not limited to a microprocessor, a microcontroller or a Digital Signal Processor (DSP), etc.) coupled to the transceiver 3001' and a memory 3003' as illustrated in FIG. 12. The transceiver 3001' is for bidirectional wireless communications and has at least one antenna to facilitate communication. The memory 3003' stores machine-readable program code executable by the processor 3002'. The processor 3002', when executing the machine-readable program code, controls the terminal device 300' to perform the above-described method 500.

Figure 13:
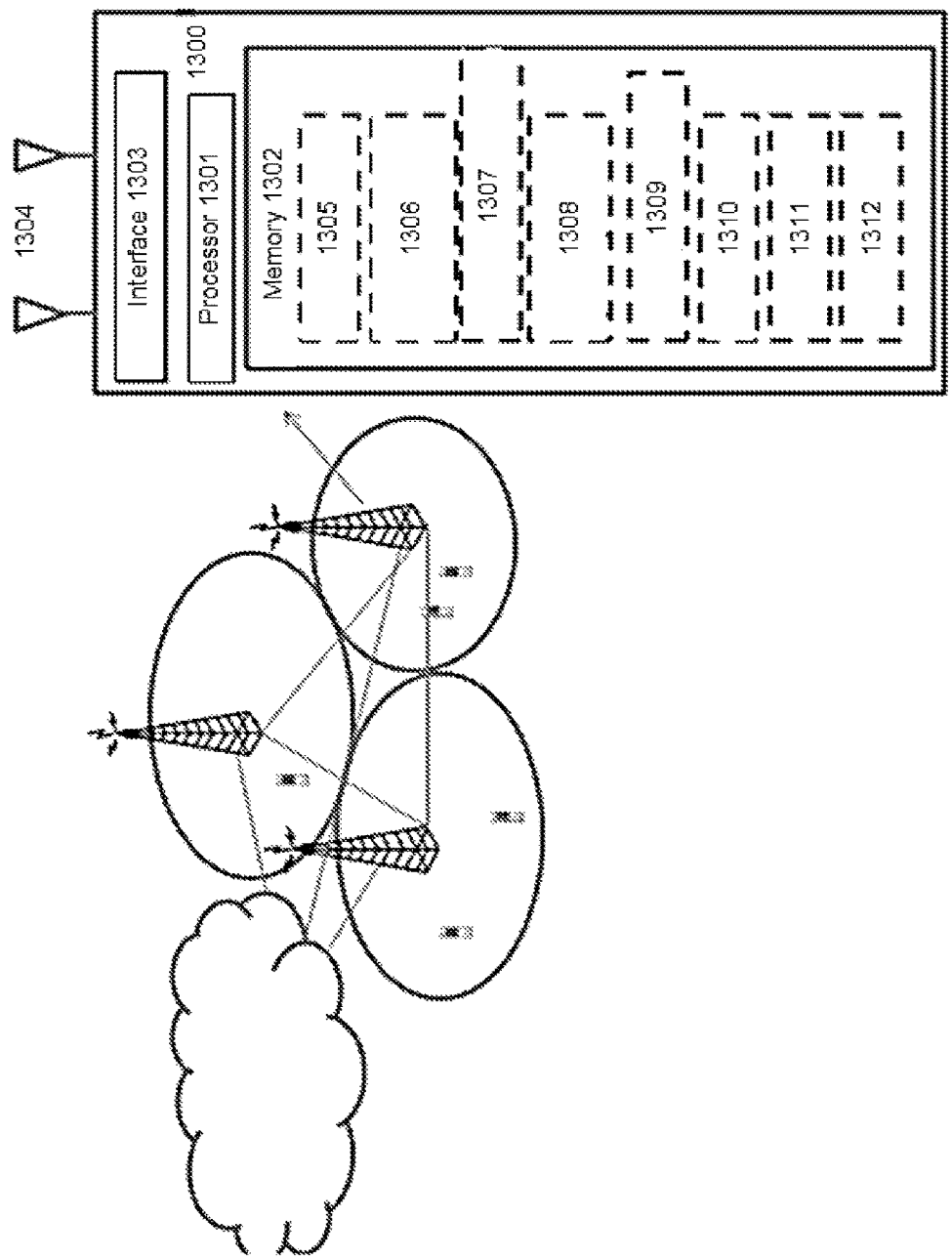
FIG. 13 is a schematic diagram illustrating an exemplary implementation wherein functions of the network device described in conjunction with FIGS. 9 and 10 are performed by a single network device within a wireless network.

FIG. 13 is a schematic diagram illustrating an exemplary implementation wherein functions of the network device 110/110' described in conjunction with FIGS. 9 and 10 are performed by a single network device 1300 within a wireless communication network.

Network Device 1300 may, in some embodiments, be an electronic device being communicatively connected to other electronic devices on the network (e.g., other network devices, end-user devices, radio base stations, etc.). In certain embodiments, a network device may include radio access features that provide wireless radio network access to other electronic devices such as UEs. For example, network device 1300 may be an eNodeB in Long Term Evolution (LTE) or other type of base station as well as a radio network controller. Network device (ND) 1300 may store and transmit (internally and/or with other electronic devices over a network) code (which is composed of software instructions and which is sometimes referred to as computer program code or a computer program) and/or data using non-transitory machine-readable media (also called computer-readable media), such as machine-readable storage media (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals). As depicted, network device 1300 includes a processor 1301, a memory 1302, an interface 1303 and an antenna 1304. These components may work together to provide various network device functionality as disclosed hereinabove. Such functionality may include implementing all, or a portion, of the modules depicted in FIG. 13.

The components of the network device 1300 are depicted as single boxes located within a single larger box for reasons of simplicity in describing certain aspects and features disclosed herein. In practice however, the network device 1300 may include multiple different physical components that make up a single illustrated component (e.g., the interface 1303 may comprise terminals for coupling wires for a wired connection and a radio transceiver for a wireless connection). As another example, the network device 1300 may be a virtual network device in which multiple different physically separate components interact to provide the functionality of network device 1300 (e.g., processor 1301 may comprise three separate processors located in three separate enclosures, where each processor is responsible for a different function for a particular instance of radio access network device 1300). Alternatively, the same physical components may be used to implement multiple separate instances of the network device (e.g., processor 1301 may execute separate instructions for multiple different instances of a radio access network device). Similarly, network device 1300 may be composed of multiple physically separate components (e.g., a NodeB component and a Radio Network Controller (RNC) component, a Base Transceiver Station (BTS) component and a Base Station Controller (BSC) component, etc.), which may each have their own respective processor, storage, and interface components. These components may be dedicated components or they may be shared in a virtualized context. In certain scenarios in which network device 1300 includes multiple separate components (e.g., BTS and BSC components), one or more of the separate components may be shared among several network devices. For example, a single RNC may control multiple NodeB's. In such a scenario, each unique NodeB and BSC pair, may be a separate network device. In some embodiments, network device 1300 may be configured such that some components may be duplicated (e.g., separate memory 1302 for different virtual instances) and some components may be reused (e.g., the same antenna 1304 may be shared by any and all virtual instances).

Processor 1301 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network device 1300 components, such as memory 1302.

Memory 1302 may comprise non-transitory machine readable storage media (also called computer-readable media) having stored therein software. For instance, memory 1302 may comprise non-volatile memory containing code to be executed by processor 1301. Because memory 1302 is non-volatile, the code and/or data stored therein can persist even when the network device is turned off (when power is removed). In some instances, while the network device is turned on that part of the code that is to be executed by the processor(s) may be copied from non-volatile memory into volatile memory (e.g., dynamic random access memory (DRAM), static random access memory (SRAM)) of that network device.

Interface 1303 may be used in the wired or wireless communication of signaling and/or data to or from network device 1300. For example, interface 1303 may perform any formatting, coding, or translating that may be needed to allow network device 1300 to send and receive data whether over a wired or a wireless connection. In some embodiments, interface 1303 may be coupled to one or more antennas 1304 which may include one or more transceivers for communicating with other similar network devices, with end user equipment and with other network devices. In some embodiments, interface 1303 may comprise radio circuitry that may receive digital data that is to be sent out to other network devices via a wireless connection. The radio circuitry may convert the digital data into a radio signal having the appropriate parameters (e.g., frequency, timing, channel, bandwidth, etc.). The radio signal may then be transmitted via antennas 1304 to the appropriate recipient(s). The radio circuitry of interface 1303 may in some instances comprise functionality for linking the Common Public Radio Interface (CPRI) stream and the antenna 1304.

The L1 module 1305 handles uplink and downlink in the physical layer, layer 1 of the protocol stack. In uplink, the L1 module processes antenna data received from the radio circuitry (e.g., over Common Public Radio Interface (CPRI)), which data processing may include removing cyclic prefix, running Fast Fourier Transform (FFT) to extract sub-channels, decoding/demodulating symbols, extracting physical channels and passing user information up to the lower layer of L2 Media Access Control (MAC). In downlink, the L1 module takes user data provided by lower layer of L2 MAC. Examples of tasks that may be performed by the L1 module in downlink may include constructing physical channels, performing turbo coding, scrambling, modulating, layer mapping, pre-coding, frequency mapping, inverse FFT, and cyclic prefix insertion and sending antenna data (e.g., over CPRI) to the interface 1303. To handle this processing, specialized hardware may be used, including accelerators, to form processing chains.

The L2-Sync module 1306 includes the synchronous parts of layer 2 of the protocol stack. The L2-Sync module includes the 3rd Generation Partnership Project (3GPP) sub-layers Medium Access Control (MAC) (including Hybrid Automatic Repeat Request (HARQ)) and Radio Link Control (RLC). The MAC sub-layer may have a separate HARQ entity for each connected UE, and a few additional HARQ entities for common needs such as system information, paging, and random access response. The RLC sub-layer may have a separate RLC entity for each logical channel, corresponding to radio bearers. Downlink and uplink may operate independently of each other, with some signaling forwarded from the uplink to the downlink. Downlink: A task of the L2-Sync module in downlink may be to take Packet Data Convergence Protocol (PDCP) Packet Data Units (PDUs) from a PDCP PDU buffer and build MAC PDUs that are sent to the L1 module. This may be triggered by a transmit order from User Plane Control (UPC) module. In downlink the L2-Sync module may also handle multiplexing of logical channels, HARQ retransmissions, MAC control elements, MAC procedures such as random access, RLC PDU buffering and retransmissions, and RLC status messages. The PDCP PDU buffers may typically be shared between the L2-Async module and the L2-Sync module. If this is not possible, for example, if L2-Async is placed at a different site, a flow control mechanism may be added to transfer PDCP PDUs from the L2-Async module to the L2-Sync module. Uplink: A task of the L2-Sync module in uplink may be to deconstruct MAC PDUs received from the L1 module into PDCP PDUs that are delivered to the L2-Async module. In uplink the L2-Sync module may also handle MAC control elements, MAC procedures such as random access, demultiplexing of logical channels, RLC PDU buffering, reordering and retransmissions, and RLC status messages. In uplink the L2-Sync module may not be part of a latency critical processing path, but may have a direct impact on the end-to-end packet latency.

The UPC (User Plane Control) module 1307 includes fast radio resource management (RRM) functions that may occur on a per-subframe basis. This may include air-interface resource scheduling, link adaptation (transport format selection), and power control. The UPC module may use input from other modules such as the L1 module and the L2-Sync module, and generate messages to other modules such as the L1 module and the L2-Sync module. The input may include buffer status reports, measurement reports, Channel Quality Indicator (CQI) reports, and HARQ feedback. The messages may be control information sent to the UEs, as well as uplink and downlink scheduling commands sent to the L1 module and the L2-Sync module. The UPC module may thus handle scheduling and optimization problems, involving many UEs and shared resources such as spectrum, power, and hardware.

The L2-Async module 1308 includes the PDCP layer, whose primary tasks may be ciphering, header compression, and integrity protection for signaling. It may also support lossless handover. In downlink, L2-Async module may maintain a PDCP PDU buffer, which is often shared with the L2-Sync module when suitable, as discussed above.

The RRM-C (Radio Resource Management Coordination) module 1309, includes functions to coordinate multiple UPC instances. The RRM-C module may include functions for performing one or more of the following: Coordinated MultiPoint (CoMP) including fast and slow uplink/downlink, Combined Cell, Dual Connectivity, Inter-Cell Interference Coordination (ICIC), enhanced Inter-Cell Interference Coordination (eICIC) and Further enhanced Inter-Cell Interference Coordination (FeICIC). The RRM-C module may take input from the L1 and the L2-Async modules and generate messages to the UPC module.

The UEH (User Equipment Handler) module 1310, includes functions for the handling and control of UE related control plane functions. UEH consists of 3GPP sub-layer Radio Resource Control (RRC). This includes the control of one or more of the following functions: Connection handling, such as setup and release of connections; Mobility handling, such as handover or redirection release; UE Measurement Control; Load Management, such as Inter-Frequency Load Balancing and Offload; and Enhanced Multimedia Broadcast and Multicast Services (eMBMS). Thus, the UEH module 1310 plays a critical role in performing the above-described method 400 which relates to handover. The UEH module may also implement the application protocols for communication with a mobility management entity (e.g. S1-AP, M3-AP) and other base stations (e.g. X2-AP). The UEH module may logically have a separate entity for each connected UE, storing all necessary data in a UE Context. Each separate entity may also implement the state machine for running all control-plane features related to a UE, including the necessary coordination between different functions for a specific UE.

The RNH (Radio Network Handler) module 1311, includes functionality to manage logical cells in the radio network on order from an operator. The RNH module may also be responsible for the handling of LRAT specific configuration data on cell and node/device level. This also includes the handling of cell relations and neighbor cell data, such as Evolved Universal Terrestrial Radio Access Network (EUTRAN) neighbor cells and cells belonging to other RATs. The RNH module may also implement a number of Self-Organizing Network (SON) related functions such as automatic handling of neighbor relations (ANR); X2 Handling, i.e. automatic handling of external base station and cells references received from another base station over an interface used for communication between base stations, such as X2; and Mobility Robustness Optimization (MRO), i.e. automatic tuning of mobility related parameters.

The TN (Transport Network) module 1312, includes features for providing the node/device with transport network capabilities based on Internet Protocol (IP) (both IPv4 and IPv6 hosts) for messages with forwarding and protocol termination. Examples of protocols could include Stream Control Transmission Protocol (SCTP), Transmission Control Protocol (TCP), User Datagram Protocol (UDP) and GPRS Tunneling Protocol User Plane, (GTP-U), with support for Security, the protocols to be used over the paths S1, M3, X2 and/or Mul. The TN module may handle the forwarding of TN traffic between Digital Units (DUs) (within the node/device and between node/devices) and management of Site Local Area Networks (LAN) packets forwarding to the Operations and Maintenance (OAM) system. Security may be supported with Internet Protocol Security (IPSec), including Internet Key Exchange (IKE) handling and Access control lists (ACL) for the Site LAN. The TN module may also handle shaping capabilities for overload situations on the transport network when needed. The interaction between the transport and radio network makes it possible for the radio domain to adapt to the actual resource situation in the backhaul network. This is done by extension in the transport network domain, and an interface to the radio domain which makes it possible for the transport network to report the available transport resources and characteristic for specific network path(s) requested by the radio network domain. This can be the available S1 path(s) in the transport network to the core network or X2 path(s) to neighboring cell sites.

Figure 14:
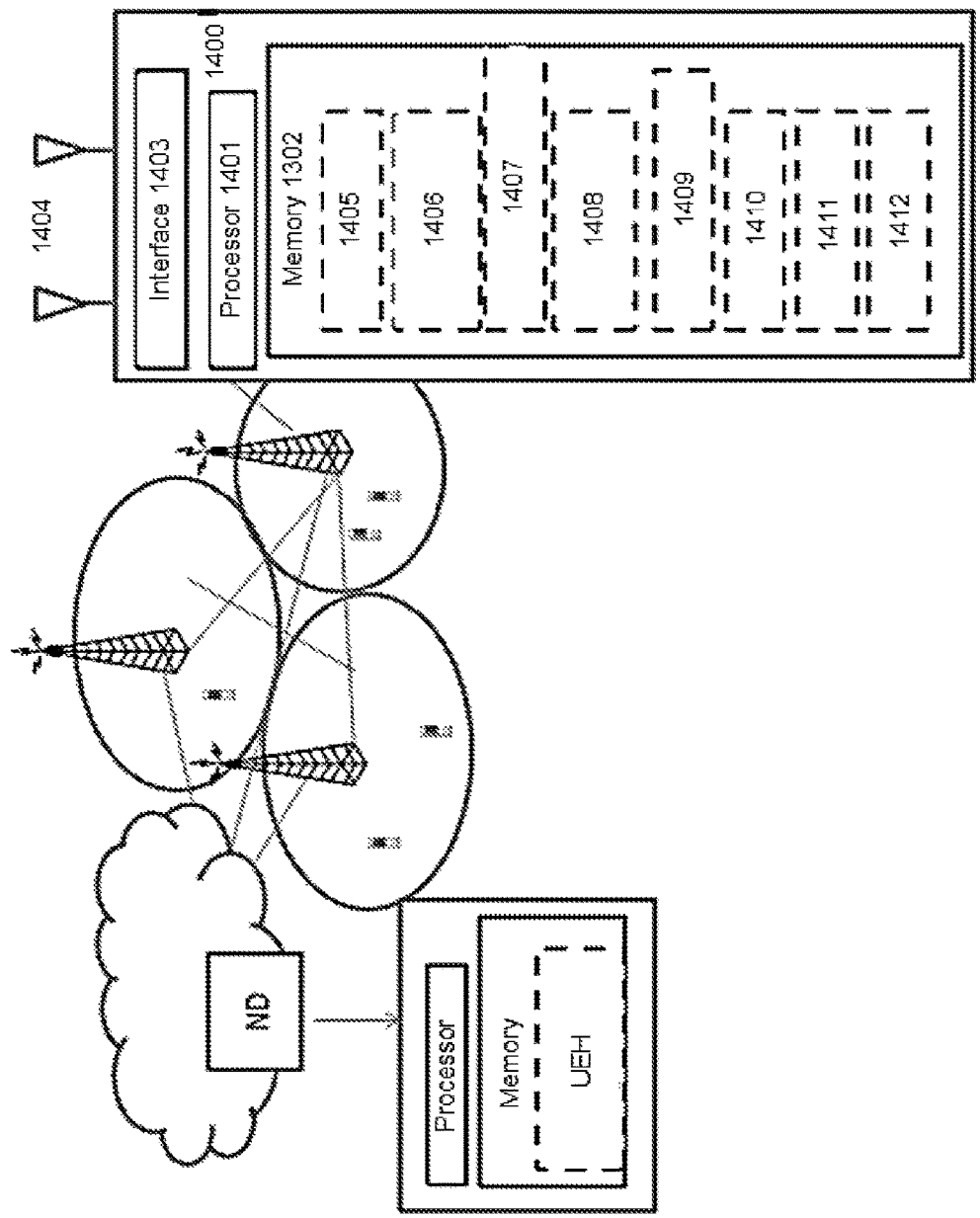
FIG. 14 is a schematic diagram illustrating an alternative implementation wherein functions of the network device described in conjunction with FIGS. 9 and 10 are distributed over two network devices within a wireless network.

As an alternative implementation to that illustrated in FIG. 13, functions of the network device 110/110' described in conjunction with FIGS. 9 and 10 may be distributed over two network devices within a wireless communication network as illustrated in FIG. 14.

As depicted, in addition to a network device 1400 which has the same structure and modules as the network device 1300, another network device 1500 separate from the network device 1400 also implements an UEH module 1510 that cooperates with the UEH module 1410 in the network device 1400 for controlling handover.

In such an implementation, the network device 1400 may be a serving network device with which a terminal device may communicate directly so as to access the network and the network device 1500 may not communicate with the terminal device directly but serves as a handover control unit which initiates transmission of a handover command from the network device 1400 to the terminal device to trigger the handover of the terminal device. Information on configurations for a set of candidate target beams and/or network devices have been transmitted from the network device 1400 to the terminal device before the handover of the terminal device is triggered. The handover command contains an identifier for identifying, from the transmitted information on the configurations for the candidate target beams and/or network devices, the information on the configuration for the target beam and/or network device.

In an embodiment, the network device 1500 which serves as the handover control unit further stops Mobile Reference Signal (MRS) transmissions from the serving network device and from all the set of candidate target beams and/or network devices except the target beam and/or network device after the handover command is transmitted and requires only the target beam and/or network device among the set of candidate target beams and/or network devices to transmit a MRS for a predetermined time period after the handover command is transmitted, so that the identifier for identifying the information on the configuration for the target beam and/or network device is derivable at the terminal device from the MRS transmitted via the target beam and/or network device and received by the terminal device.

The present disclosure is described above with reference to the embodiments thereof. However, those embodiments are provided just for illustrative purpose, rather than limiting the present disclosure. The scope of the disclosure is defined by the attached claims as well as equivalents thereof. Those skilled in the art can make various alternations and modifications without departing from the scope of the disclosure, which all fall into the scope of the disclosure.

What is claimed is:

1. A method in a network device for facilitating handover of a terminal device served by the network device to a target beam, the method comprising:
   transmitting information on configurations for connecting to beams of a set of candidate target beams to the terminal device before the handover of the terminal device is triggered, wherein the set of candidate target beams are formed by beamforming and wherein the information on the configurations include information to provide or derive identifiers associated with respective configurations;
   transmitting a handover command to the terminal device to trigger the handover of the terminal device; and
   stopping reference signal transmission from the set of candidate target beams, except the target beam selected for the handover of the terminal device, and in which a reference signal of the target beam includes an identifier, in order for the terminal device to use the identifier to identify respective information from the information on the configurations to connect to the target beam.

2. The method of claim 1, wherein
the information on the configurations for the set of the candidate target beams is stored in a table with indexes each corresponding to respective one of the configurations, and
the identifiers corresponding to the indexes.

3. The method of claim 2, wherein the indexes are generated from the identifiers.

4. The method of claim 1, wherein the set of the candidate target beams includes some or all of neighboring beams of the network device.

5. The method of claim 1, wherein the information on the configurations for the set of the candidate target beams is transmitted to the terminal device immediately after the terminal device connects to the network device.

6. The method of claim 1, wherein the information on the configurations for the set of the candidate target beams is transmitted to the terminal device when communication quality between the terminal device and the network device falls below a threshold.

7. A network device for facilitating handover of a terminal device served by the network device to a target beam, the network device comprising:
a processor; and
a non-transitory computer readable storage medium, the non-transitory computer readable storage medium containing instructions which, when executed by the processor, cause the network device to:
generate information on configurations for connecting to beams of a set of candidate target beams for transmission to the terminal device before the handover of the terminal device is triggered, wherein the set of candidate target beams are formed by beamforming and wherein the information on the configurations include information to provide or derive identifiers associated with respective configurations;
transmit the information on the configurations for the set of the candidate target beams to the terminal device;
generate a handover command for transmission to the terminal device to trigger the handover of the terminal device; and
stop reference signal transmission from the set of candidate target beams, except the target beam selected for the handover of the terminal device, and in which a reference signal of the target beam includes an identifier, in order for the terminal device to use the identifier to identify respective information from the information on the configurations to connect to the target beam.

8. The network device of claim 7, wherein
the information on the configurations for the set of the candidate target beams is stored in a table with indexes each corresponding to respective one of the configurations, and
the identifiers corresponding to the indexes.

9. The network device of claim 8, wherein the indexes are generated from the identifiers.

10. The network device of claim 7, wherein the set of the candidate target beams includes some or all neighboring beams of the network device.

11. The network device of claim 7, wherein the information on the configurations for the set of the candidate target beams is transmitted to the terminal device immediately after the terminal device connects to the network device.

12. The network device of claim 7, wherein the information on the configurations for the set of the candidate target beams is transmitted to the terminal device when communication quality between the terminal device and the network device falls below a threshold.

13. A method performed in a wireless communication network for facilitating handover of a terminal device served by its serving network device to a target beam, the method comprising:
initiating, by a handover control unit, transmission of a handover command to the terminal device to trigger the handover of the terminal device, wherein information on configurations for connecting to beams of a set of candidate target beams have been transmitted to the terminal device before the handover of the terminal device is triggered, wherein the set of candidate target beams are formed by beamforming and wherein the information on the configurations include information to provide or derive identifiers associated with respective configurations; and
stopping reference signal transmission from the set of candidate target beams, except the target beam selected for the handover of the terminal device, and in which a reference signal of the target beam includes an identifier, in order for the terminal device to use the identifier to identify respective information from the information on the configurations to connect to the target beam.

* * * * *